(12) United States Patent
Place

(10) Patent No.: US 6,912,939 B1
(45) Date of Patent: Jul. 5, 2005

(54) OUT OF ROUND TOOL BIT HOLDER ASSEMBLY

(75) Inventor: Brent Place, Hager City, WI (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 10/740,959

(22) Filed: Dec. 17, 2003

(51) Int. Cl.$^7$ .............................................. B23B 5/08
(52) U.S. Cl. ........................................ 82/113; 82/46
(58) Field of Search .................... 82/113, 46; 409/138, 409/140

(56) References Cited

U.S. PATENT DOCUMENTS

| | | | |
|---|---|---|---|
| 4,739,638 A | | 4/1988 | Lin |
| 4,739,685 A | * | 4/1988 | Ricci ............................ 82/113 |
| 4,825,543 A | * | 5/1989 | Thalmann et al. ............. 30/96 |
| 4,944,205 A | * | 7/1990 | Ricci ............................ 82/113 |
| 5,881,618 A | * | 3/1999 | Ricci et al. ................... 82/128 |
| 6,427,567 B1 | * | 8/2002 | Ricci et al. ................... 82/113 |

* cited by examiner

Primary Examiner—Willmon Fridie, Jr.
(74) Attorney, Agent, or Firm—Nikolai & Mersereau, P.A.

(57) ABSTRACT

A tool slide assembly mounted on a clamshell lathe where the clamshell lathe is used to machine an out-of-round work piece. The tool slide assembly generally comprises a base mounted on the rotatable ring of the clamshell lathe and a tool bit holder. The tool bit holder comprises a follower member and a tool block adapted to hold a tool bit, where the follower member is urged against an outer surface of the out-of-round work piece by a plurality of springs. The tool block is incrementally translated such that the tool bit gets fed into the out-of-round work piece.

12 Claims, 4 Drawing Sheets

OUT OF ROUND TOOL BIT HOLDER ASSEMBLY

I. BACKGROUND OF THE INVENTION

A. Field of the Invention

This invention relates to a new and improved assembly for holding a tool bit used to machine an out-of-round work piece. In particular the invention relates to a slidable assembly used in connection with a clamshell lathe for machining a work piece.

B. Description of the Related Art

My previous U.S. Pat. No. 4,739,685 on a clamshell lathe assembly teaches how to machine a pipe and provide a bevel cut using a clamshell lathe. The major benefit of the '685 patent is that it allows one to easily attach and detach the lathe from the work piece to be machined. A tool bit mounted in a tool slide affixed to the rotatable ring of the clamshell lathe then orbits the pipe and machines said pipe.

A problem arises however when the work piece is out-of-round. Prior lathe assemblies are designed for circular work pieces. Out-of-round work pieces present a special challenge because the prior art tool bits tend to make an uneven cut of the out-of-round work piece. Specifically, if the tool bit does not follow the outside surface of the work piece, the bevel length of the cut changes at locations where the work piece is out-of-round. Thus, a need exits to provide a tool bit slide that can follow the outside diameters of the out-of-round work piece.

II. BRIEF SUMMARY OF THE INVENTION

The present invention relates to a tool slide assembly used in a clamshell lathe where the clamshell lathe is being used to machine an out-of-round work piece. The tool slide assembly generally comprises a base mounted on a rotatable ring of the clamshell lathe and a tool bit holder arranged to follow the outer surface of an out-of-round work piece as the tool slide assembly is rotated about said outer surface.

The tool bit holder includes a roller operatively coupled to the tool bit holder. The roller is urged against the outer surface of the work piece by a plurality of springs, which are operatively disposed between the base and the tool bit holder. The tool bit holder also includes a tool block, which holds the tool bit used to make a bevel cut in the out-of-round work piece. The tool bit holder is incrementally translated as it orbits the rotatable ring.

III. BRIEF DESCRIPTION OF THE DRAWINGS

The foregoing features, object and advantages of the invention will become apparent to those skilled in the art from the following detailed description of the preferred embodiment, especially when considered in conjunction with the accompanying drawings in which like numerals in the several views refer to corresponding parts.

IV. DETAILED DESCRIPTION OF THE INVENTION

The present invention represents broadly applicable improvements to a tool slide assembly, which holds a tool bit for use in a clamshell lathe assembly. The embodiments detailed herein are intended to be taken as representative or exemplary of those in which the improvements of the invention may be incorporated and are not intended to be limiting. For purposes of discussion, and without any limitation intended, the tool slide assembly of the present invention will be described in conjunction with a clamshell lathe assembly of known suitable construction. Those skilled in the art will appreciate that the tool slide assembly of the present invention may be utilized with a variety of other available lathes for machining work pieces.

Figure 1:
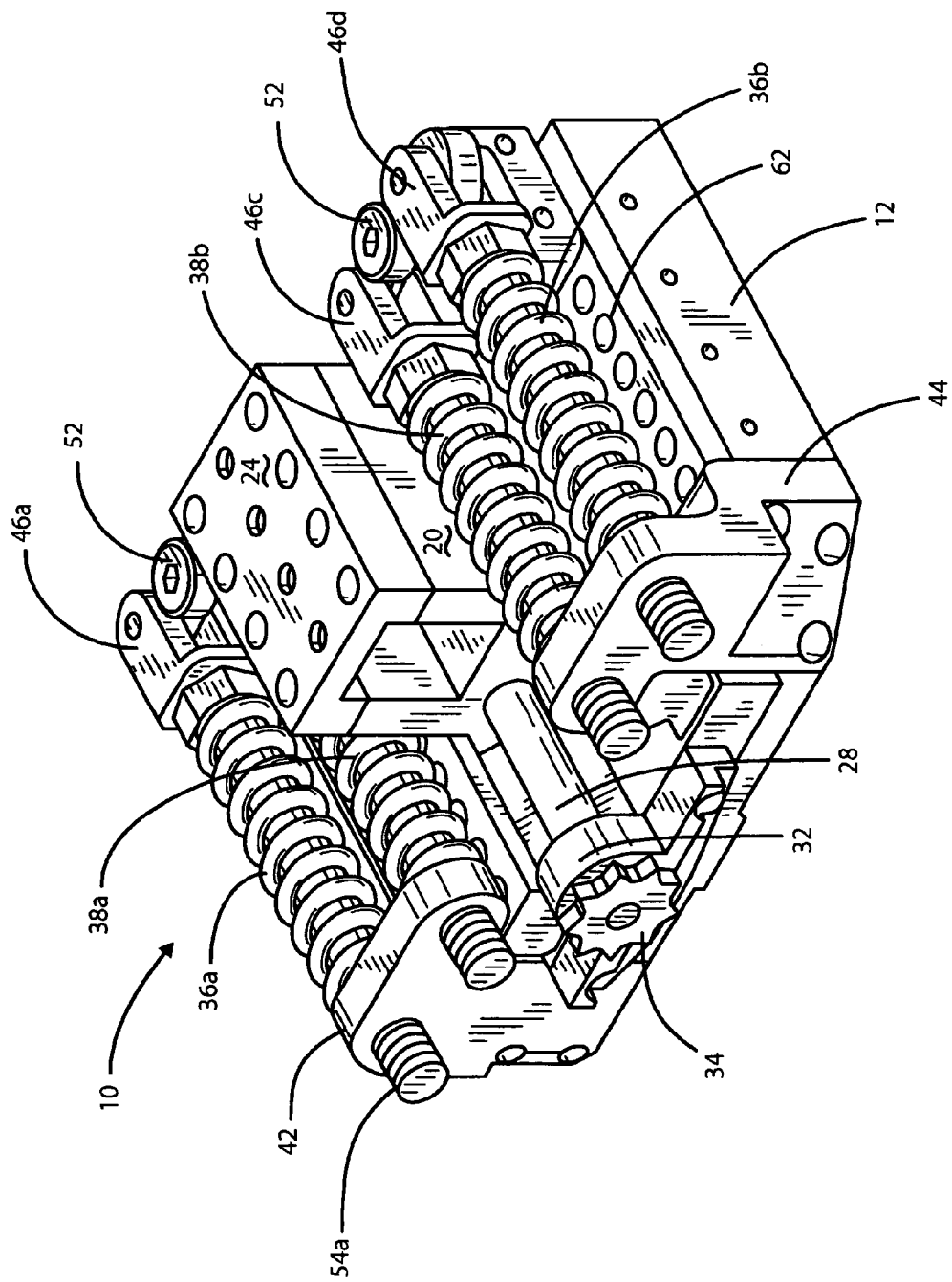
FIG. 1 is a front perspective view of the tool slide assembly for machining an out-of-round work piece.
Figure 2:
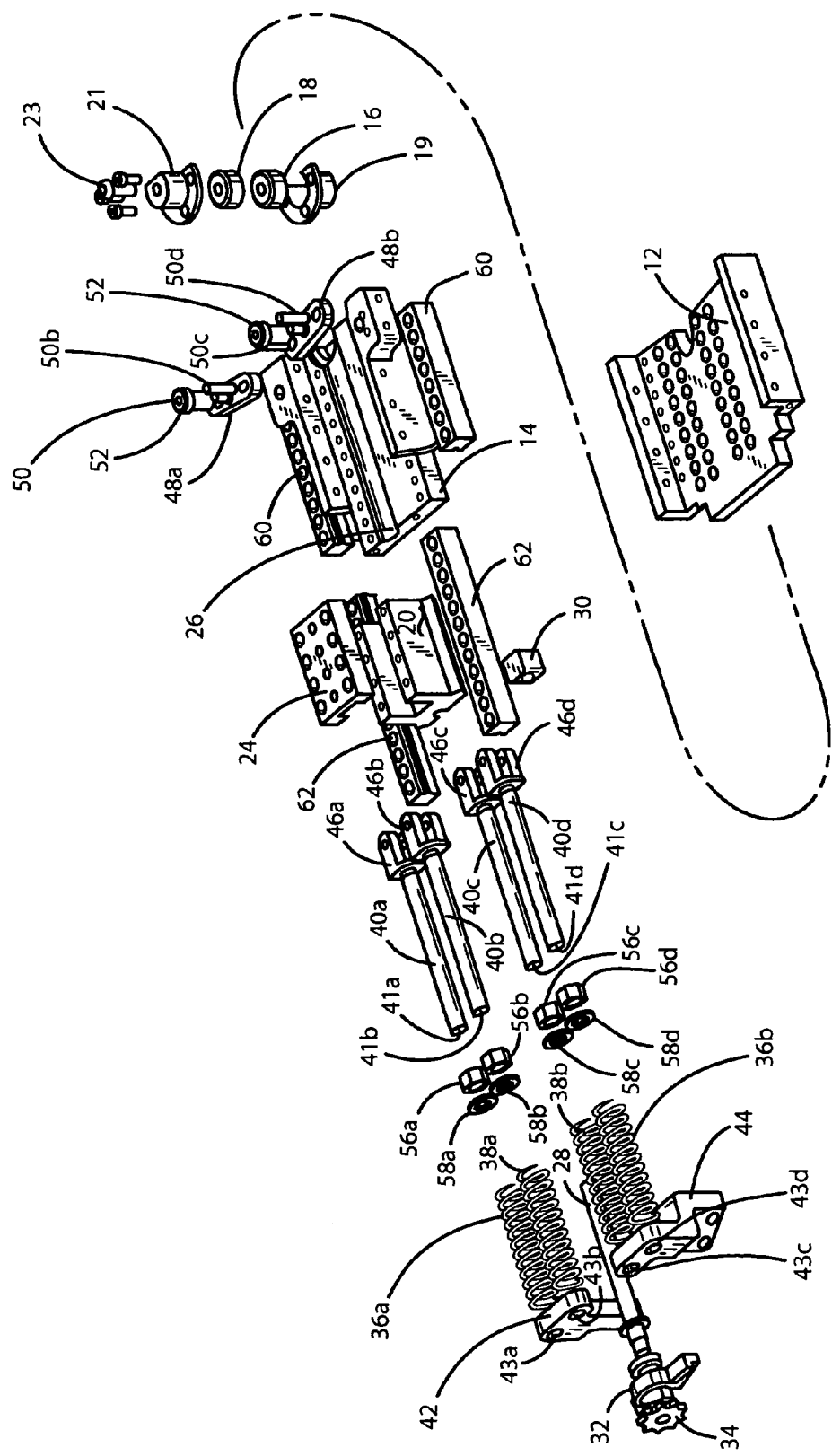
FIG. 2 is an exploded view of the tool slide assembly shown in FIG. 1.
Figure 3:
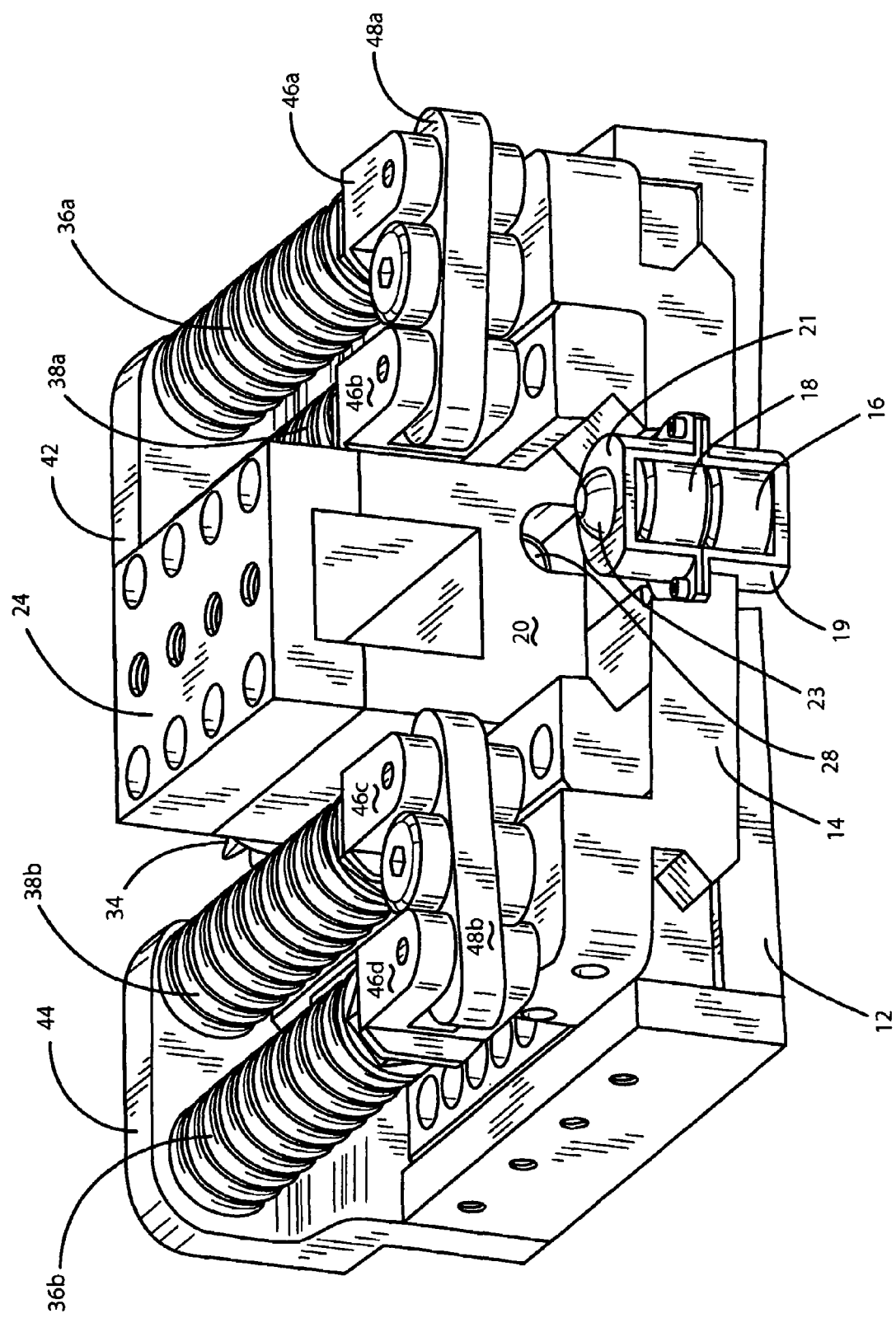
FIG. 3 is a rear perspective view of the tool slide assembly shown in FIG. 1.
Figure 4:
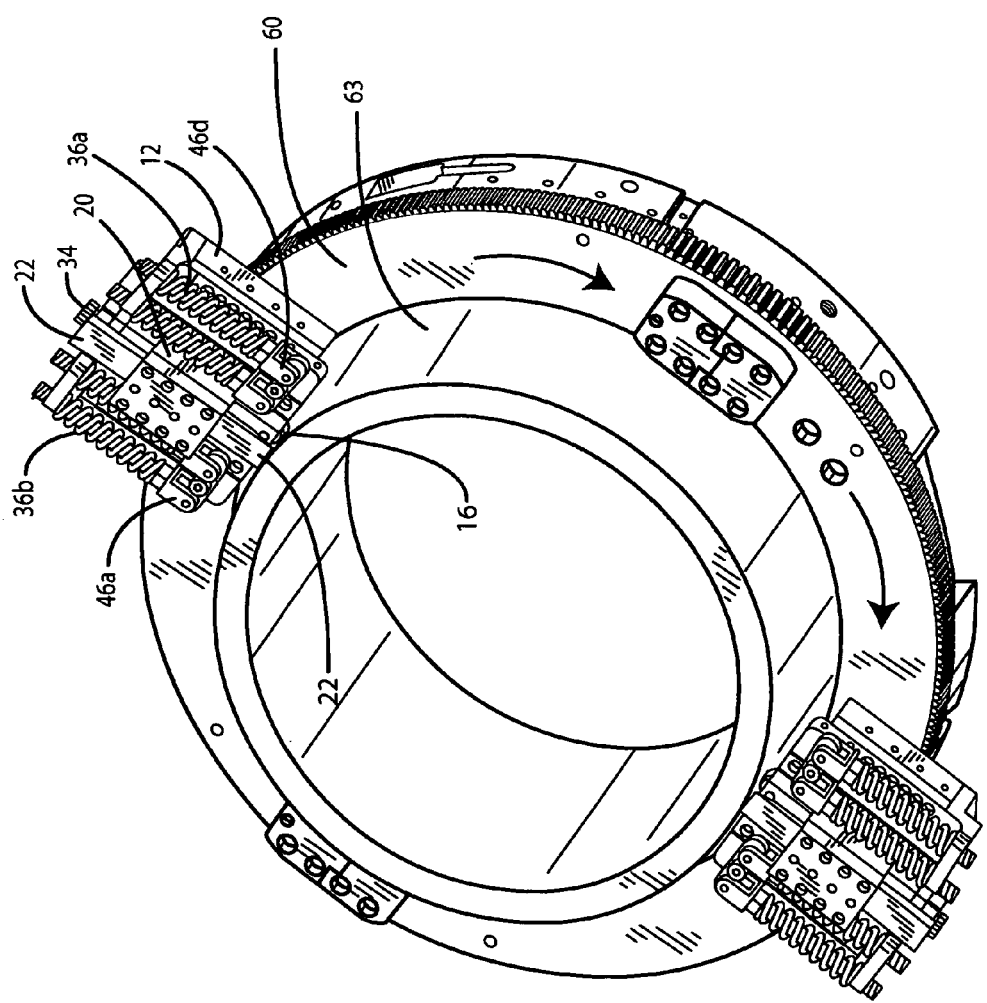
FIG. 4 is a top perspective view of a first and second tool slide assembly shown in FIG. 1 mounted onto a rotatable ring of a clamshell lathe assembly.

FIG. 1 shows a perspective view of the slide bit assembly 10. The exploded view in FIG. 2 shows that the tool bit assembly generally comprises a base 12 and a tool bit holder. The tool bit holder comprises a slide plate 14, which includes two rollers 16 and 18, that are journaled for rotation in an open-face shroud comprised of a lower cup-shaped bracket 19 and an upper cup-shaped bracket 21. An axel pin 23 passes through central aligned bores in the top bracket 21 and the rollers 18 and 16. The shrouded roller assembly is connected to a top surface of the slide plate 14 as best seen in FIG. 3 by a support axle pin 23. The tool bit holder further includes a tool block 20 for holding a tool bit 22 (FIG. 4). The tool bit 22 is captured in the tool block 20 by a top cap 24.

The slide plate further includes a midline groove 26 for receiving a threaded feed screw 28 which carries a feed nut 30 (FIG. 2). The feed nut 30 is captured in a recess (not shown) formed in the bottom surface of the tool block 20 and cooperates with the feed nut 30 to translate the tool block 20 along the slide plate 14. As the feed screw 28 is rotated, the feed nut 30 carries the tool block 20 along the groove 26. The feed screw 28 is supported by the feed nut 30 and a feed screw bracket 32 which is mounted at the proximal end of the slide plate 14. A starwheel 34 is connected to an end of the feed screw 28 proximate to the feed screw bracket 32. As the rotatable ring 60 of the clamshell carries the tool slide assembly 10 past a stationary pin (not shown) a star wheel 34 is engaged by the pin and the feed screw 28 is rotated, thus translating the tool block 20 and the cutting tool 22 down the slide plate 14.

The rollers 16 and 18 are urged against an outer surface of a work piece by a plurality of helical compression springs, including a first and second heavy spring 36a, 36b and a first and second light springs 38a, 38b. The plurality of springs is supported by spring linkages 40a, 40b, 40c and 40d that include threaded rods that extend through the center of springs 36a, 36b, 38a, and 38b. The proximal ends 41a, 41b of the spring linkages 40a, 40b pass into a left spring bracket 42 through threaded apertures 43a and 43b. The proximal ends 41c, 41d of the spring linkages 40c, 40d pass into a right spring bracket 44 through threaded apertures 43c and 43d. On the distal end of the spring linkages 40a, and 40b are rocker clevis brackets 46a and 46b which grasp an end of rocker link 48a. On the distal end of the spring linkages 40c, 40d are rocker clevis brackets 46c and 46d which each grasp an end of rocker link 48b. Dowel pins 50a, 50b, 50c, and 50d pass through aligned holes in each rocker clevis bracket 46a, 46b, 46c, and 46d and in the rocker links 48a and 48b to connect the spring linkages 40a, 40b, 40c, and 40d to rocker links 48a and 48b. The rocker links 48a and 48b horizontally pivot on the slide plate 14 on the axis provided by shoulder screws 52.

Hex nuts 56a, 56b, 56c, 56d are also mounted on spring linkages 40a, 40b, 40c, and 40d proximate each rocker clevis bracket 46a, 46b, 46c, and 46d. Washers 58a, 58b, 58c, and 58d is mounted on spring linkages 40a, 40b, 40c, and 40d sandwiched between Hex buts 56a, 56b, 56c, and 56d and light springs 36a and 36b and heavy springs 38a and 38b. Tightening of the hex nuts 56a, 56b, 56c, and 56d adjusts the tensions in the springs 36a, 36b, 38a, and 38b.

OPERATION

When the tool slide assembly 10 is mounted on the clamshell lathe 60 the tool slide assembly 10 rotates about an out-of-round work piece 63 (FIG. 4) with the roller 16 urged against the out-of-round work piece 63. When the rollers 16 and 18 roll over a high spot in the work piece 63, the rollers 16 and 18 push the slide plate 14 and compresses the light springs 38a and 38b. Because the tool block 20 and tool bit 22 are attached to the slide plate 14, the tool block 20 and tool bit 22 follow the path of the rollers 16 and 18. As the clamshell lathe ring gear 60 rotates carrying the tool slide assembly 10, the star wheel 34 is tripped feeding the tool bit 22 against the work piece 63. As the tool bit 22 gets fed into the work piece 63, the force pushing against the light springs 38a and 38b is increased. Once the light springs 38a and 38b are compressed to a pre-determined amount, the rocker links 48 transfer the force to the heavy springs 36a and 36b by pivoting. The heavy springs 36a and 36b will compress and counteract the force created by the tool bit 22 being fed into the out-of-round work piece 63.

Obviously, many modifications and variations of the present invention are possible in light of the above teaching. It is therefore to be understood that, within the scope of the appended claims, the invention may be practiced otherwise than as specifically described.

What is claimed is:

1. In a clamshell lathe assembly for machining a work piece, the clamshell lathe assembly including a rotatable ring operatively coupled to a stationary ring, the rotatable ring carrying a tool bit for machining a work piece, wherein the improvement comprises:
   (a) a tool slide assembly comprising a base and tool bit holder slidably mounted on the base for holding the tool bit where said base is adapted to be mounted on the face of the rotatable ring;
   (b) a follower assembly operatively coupled to the tool bit holder for following a contour of an outer surface of the work piece as the tool bit is rotated about said outer surface, said follower assembly including at least one roller operatively coupled to a slide plate where a plurality of springs operatively disposed between the slide plate and the base urge the rollers against the outer surface of the work piece; and
   (c) the tool bit holder further including a tool block capable of incremental translation upon orbiting at the rotatable ring.

2. The clamshell lathe in claim 1 wherein in the base has a plurality of apertures for bolting the base to the face of the rotatable ring.

3. The clamshell lathe in claim 1 wherein the slide plate has a midline groove for receiving a threaded feed screw therein, the feed screw carrying a feed nut that cooperates with the tool block.

4. The clamshell lathe assembly in claim 3 here the tool block is translated along the slide plate by rotation of the threaded feed screw.

5. The clamshell lathe in claim 3 where the threaded feed screw is supported by a feed screw bracket mounted on the tool bit holder and the feed nut is mounted on a bottom surface of the tool block.

6. The clamshell lathe in claim 3 where the threaded feed screw further includes a starwheel for turning the threaded feed screw upon a predetermined rotation of the rotatable ring.

7. The clamshell lathe assembly in claim 1 wherein the plurality of springs are supported by a plurality of spring linkage rods that extend through first and second spring brackets to first and second rocker links, said first and second rocker being pivotally connected to the tool bit holder.

8. The clamshell lathe assembly in claim 7 where the first and second rocker links individually pivot on a first and second shoulder screws extending through a midpoint of the first and second rocker links into the tool bit holder.

9. The clamshell lathe assembly in claim 7 where the spring linkage rods are attached to the first and second rocker links by dowel pins extending through a clevis affixed to an end of the spring linkage rods and the first and second rocker links.

10. The clamshell lathe assembly in claim 1 where the tension of the plurality of springs is adjustable.

11. The clamshell lathe assembly in claim 1 where the tool block comprises base member and a top cap for capturing the tool bit in the tool block.

12. The clamshell lathe in claim 10 wherein the linkage rods are threaded and carry a hex nut thereon, rotation of the hex nuts varying the spring tension of the plurality of springs.

* * * * *